Figure 1:
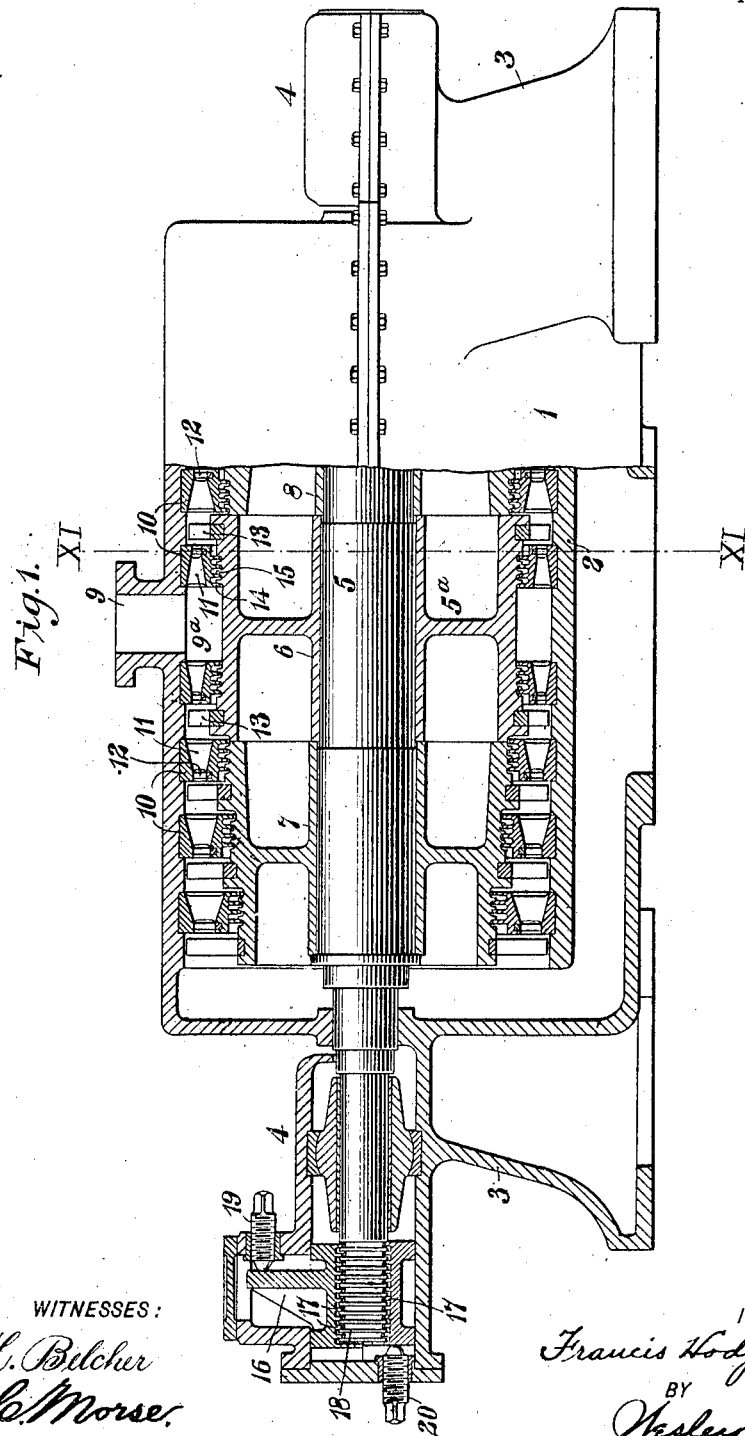

F. HODGKINSON.
FLUID PRESSURE TURBINE.
APPLICATION FILED NOV. 13, 1902. RENEWED APR. 20, 1903.

992,194.

Patented May 16, 1911.

4 SHEETS—SHEET 2.

WITNESSES:
C. L. Belcher
J. C. Morse

INVENTOR
Francis Hodgkinson
BY
Wesley L. Carr
ATTORNEY.

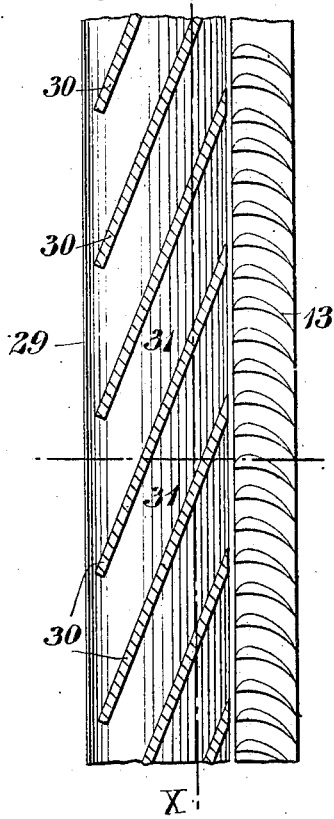
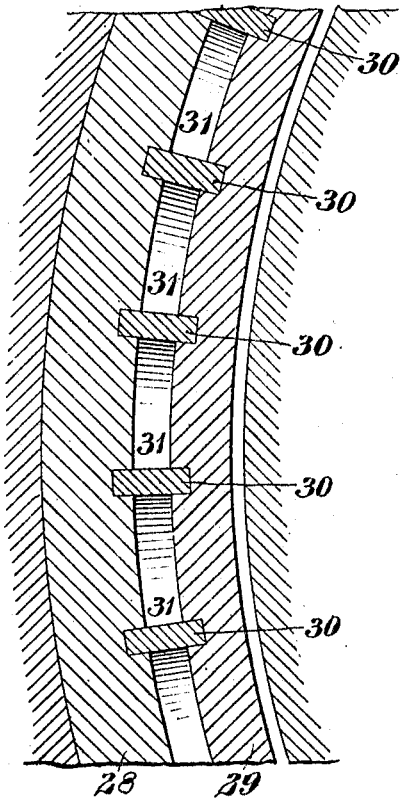
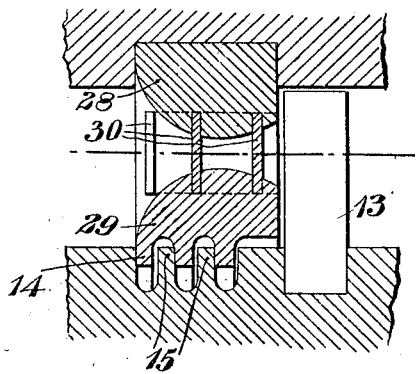

UNITED STATES PATENT OFFICE.

FRANCIS HODGKINSON, OF EDGEWOOD PARK, PENNSYLVANIA, ASSIGNOR TO THE WESTINGHOUSE MACHINE COMPANY, A CORPORATION OF PENNSYLVANIA.

FLUID-PRESSURE TURBINE.

992,194.  Specification of Letters Patent.  Patented May 16, 1911.

Application filed November 13, 1902, Serial No. 131,148. Renewed April 20, 1908. Serial No. 428,140.

*To all whom it may concern:*

Be it known that I, FRANCIS HODGKINSON, a subject of the King of Great Britain and Ireland, residing at Edgewood Park, in the county of Allegheny and State of Pennsylvania, United States of America, have invented a new and useful Improvement in Fluid-Pressure Turbines, of which the following is a specification.

My invention relates to fluid-pressure engines of the rotary type, in which the impact velocity of expanded fluid is utilized by one or more sets of blades or buckets to produce direct rotation of a shaft.

The object of my invention is to provide a machine of the character indicated which shall be substantially free from wasteful leakage of the actuating fluid and to so simplify, cheapen and generally improve the structure as to provide a commercial engine that shall be both durable and economical in service.

The use of fluid-pressure turbines of the multi-cellular type, in which the fluid is successively expanded and in which the velocity resulting from each successive expansion is utilized by successive annular sets of blades or buckets, is usually attended by considerable losses on account of the escape of the expanded fluid through the clearance spaces between the ends of the blades or buckets and the casing and between the ends of the guide vanes and the contiguous portions of the drum. Attempts have been made to reduce or eliminate these losses by making extremely small clearance spaces between the free ends of the moving blades and the casing and, also, between the free ends of the stationary vanes and the drum. While this construction serves to reduce the amount of leakage so long as a perfectly concentric relation is maintained, any lateral displacement of any of the rotating parts will almost certainly result in serious injury to some of the blades or vanes. Since more or less wear of bearings and whipping of shafts must occur in engines of this character on account of the high speeds at which they operate, it is clear that leakage losses cannot safely be eliminated by the means above mentioned.

I propose, by my present invention, to eliminate or very materially reduce the losses above mentioned and, at the same time, to avoid danger of injury to the blades and vanes on account of the wear of engine bearings, deflection of shafts, etc.

My invention is illustrated in the accompanying drawings, in which—

Figure 2:
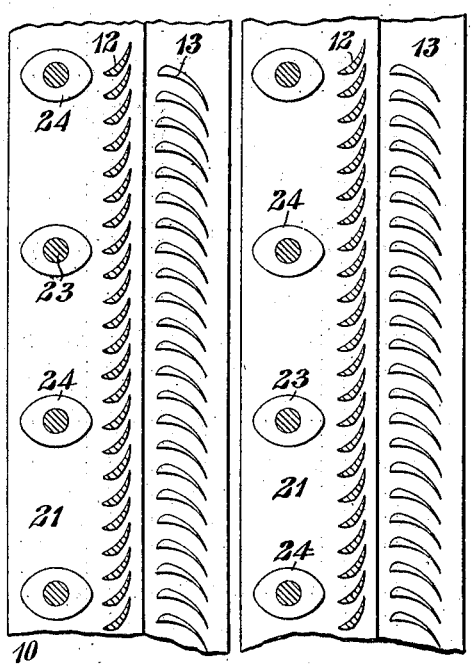
Figure 4:
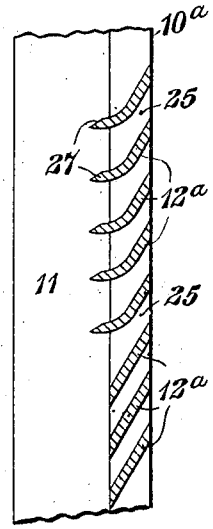
Figure 6:
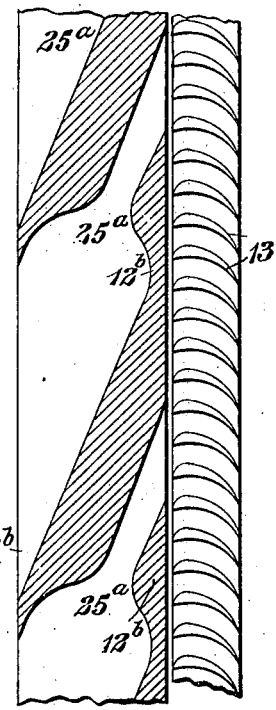
Figure 3:
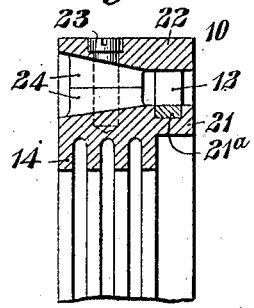
Figure 5:
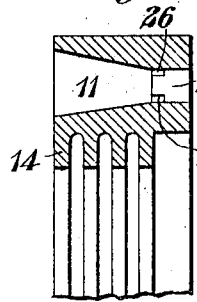
Figure 7:
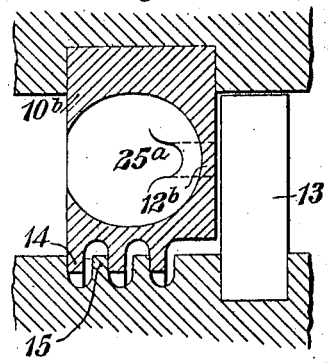
Figure 11:
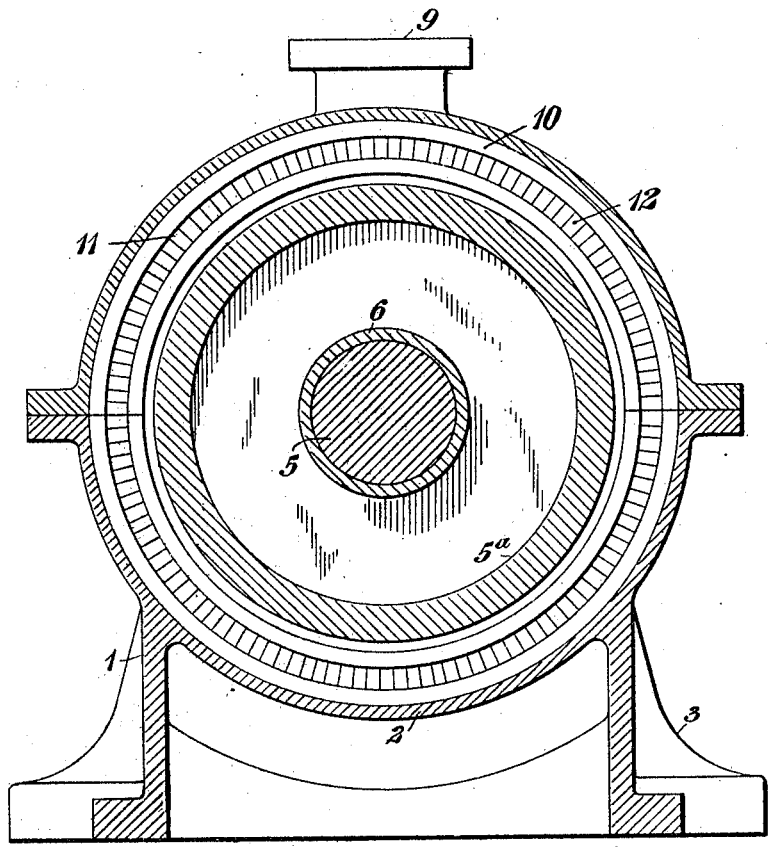

Figure 1 is a view, partially in side elevation and partially in longitudinal section, of the turbine. Fig. 2 is an enlarged, sectional view taken on a curved line through the blades, vanes and passages of Fig. 1. Fig. 3 is a sectional view showing one means of attaching and supporting the guide vanes. Fig. 4 is a view corresponding to Fig. 2 and showing a modification, and Fig. 5 is a sectional, detail view of the construction shown in Fig. 4 and corresponding to Fig. 3. Figs. 6 and 7 correspond, respectively, to Figs. 2 and 4 and Figs. 3 and 5 and illustrate a further modification. Figs. 8 and 9 are sectional views corresponding, respectively, to Figs. 2, 4 and 6 and Figs. 3, 5 and 7 and illustrating a further modification. Fig. 10 is a sectional view on line X—X of Fig. 8. Fig. 11 is a transverse section on line XI—XI of Fig. 1.

The turbine here illustrated is of the variety in which the fluid, which, for convenience of description, will be hereafter referred to as steam, is admitted at the middle of the engine and flows in opposite directions to the exhaust ports at the ends. The invention is not, however, limited to this variety of engine, but may be embodied in one in which the steam is introduced at one end and is exhausted at the other end, but, when embodied in an engine of this character, it will be found desirable to employ a balance piston in order to counterbalance the end thrust, this variety of engine and balancing means being well known in the art.

As illustrated in the drawings, the frame 1 of the engine comprises a cylindrical casing 2 and standards or pillars 3 provided with bearings 4 for the shaft 5. Mounted upon the shaft is a drum 5ᵃ, here shown as composed of three sections 6, 7 and 8, though, except for convenience of manufacture, the drum might be cast in a single piece.

The casing 2 is provided, at its top, midway between its ends, with an inlet port 9 opening into a chamber 9ᵃ, and, at each side of said chamber, with a plurality of rings 10, four of such rings being shown at each side of the port, but the number may, of course, be varied within any desired limits. Each ring 10 is provided with tapering passages 11 for the steam, and near the exit ends of these passages, are located curved guide vanes 12, which form passages that are, in effect, nozzles through which the steam expands and is directed against the adjacent set of curved blades or buckets 13, mounted upon the drum 5ᵃ.

The rings 10 may be constructed in a variety of ways and the vanes may be mounted or formed therein in accordance with the structure or mode of construction of the rings, as will be hereinafter more particularly pointed out, but, in any case, there is no clearance space between the ends of the vanes and the inner walls of the ring. It will be noted further, that each successive ring, from the inlet port to each end of the casing and drum where the steam exhausts, has passages 11 of progressively increased dimensions in order to economically utilize the steam as it is progressively expanded. It will be noted further, that the blades 13 are of materially greater dimensions than the guide vanes 12 and that they project outwardly beyond the outer walls of the exit passages, so that all of the steam that passes between the vanes will impinge against the moving blades.

In order to permit of free rotation of the shaft and drum and, at the same time, avoid leakage of steam, I provide the inner periphery of each ring 10 with one or more annular flanges or collars 14, four of such flanges or collars being shown upon each ring, but the number may, of course, be varied to suit the desires of the builder or user of the engine. For the purpose of coöperating with these flanges 14, I provide the drum with corresponding flanges or collars 15, which project into the grooves or spaces between the flanges 14 and on the side toward the exhaust port. By making the grooves of sufficient depth, considerable play, due to wear of the bearings or whipping of the shaft, may be permitted without interfering in any way with the operation of the engine.

In order to maintain the flanges in proper relation to each other, I provide the frame, adjacent to one of the bearings 4, with a two-part adjustable block 16, the bore of which is provided with a series of collars 17 similar to the flanges 14, and the corresponding portion of the shaft is also provided with similar collars 18, which alternate or mesh with the collars 17. I provide screws 19 and 20 at the respective ends of the block 16, the former of which engages the upper and the latter the lower half of the block so that said parts may be adjusted longitudinally in either direction to get the desired coöperative relation between the flanges 14 and 15.

The flanges or collars 14, 15, 17 and 18 may be formed integral with their supporting members, as indicated, or they may be made separately and fastened thereon, as may be found desirable. With this arrangement, the distance between the coöperating flanges 14 and 15 may be as small as three or four thousandths of an inch without interfering in any way with the satisfactory operation of the engine and, as above indicated, considerable clearance space may be provided between the free ends of the blades 13 and the corresponding portion of the casing without resulting in any material loss on account of leakage.

Referring now particularly to Figs. 2 and 3, the ring 10 is shown as comprising two concentric parts 21 and 22, the former of which is provided with a groove 21ᵃ in which the ends of the vanes 12 are suitably seated and fastened. The part 22, which, as well as the part 21, will be made in two or more sections, as indicated in Fig. 2, may be placed in position with its inner edge in contact with the vanes 12 and be clamped in this position by means of screws 23, each of the parts 21 and 22 having spacing lugs or projections 24 through which the screws 23 project.

In Figs. 4 and 5, I have shown a ring 10ᵃ cast or otherwise formed as a single piece. This may be cast with passages or openings 25 leading to the chambers 11, or these passages may be cut, by means of a suitable tool, after the ring is formed. Grooves 26 are then cut so as to free the ends of the vanes 12ᵃ and these ends may then be bent to the proper form, as indicated at 27 in Fig. 4. In the construction shown in Figs. 6 and 7, the ring 10ᵇ is also cast or otherwise formed in one piece and through it are drilled holes 25ᵃ of the desired size and shape and disposed at the proper angles to insure satisfactory expansion of the fluid and suitable impact of the same against the blades 13, the material between adjacent holes constituting, in effect, guide vanes 12ᵇ.

In the construction shown in Figs. 8, 9 and 10, I provide two concentric rings 28 and 29, the latter of which is provided on its inner periphery with collars or flanges 14 to coöperate with flanges or collars 15 on the drum in the manner already described. In the outer periphery of the ring 29 and in the inner periphery of the ring 28, are cut corresponding grooves or slots, in which are fitted partition plates 30, which form portions of the walls of the expansion passages or nozzles 31 and serve to maintain the rings 28 and 29 in proper relation to each other. It will be noted that the adjacent surfaces of the rings 28 and 29 are laterally curved and that the partition plates are disposed at a considerable angle to the axis of the turbine, it being understood that the contour and angular disposition of these parts may be varied from what is shown to such extent as may be necessary to insure the desired expansion of the operating fluid and direction of the same against the movable blades 13.

Other methods of forming the expansion passages and the adjacent parts may be adopted, if found convenient or desirable, and the details of construction of the engine as a whole be otherwise varied from what is shown within the range of knowledge of those skilled in the art without departing from the scope of my invention.

I claim as my invention:

1. In a fluid-pressure turbine, the combination with a casing having an annular set of expansion passages and one or more annular flanges, of a rotary drum, a portion of which is concentrically located with reference to said set of passages and an adjacent portion of which has an annular set of blades of materially greater radial length than the corresponding exit openings of said passages, said concentric portion having one or more annular flanges which are located at one side of, and in close proximity to the stationary annular flange or flanges and means for maintaining said relation of the stationary and rotary flanges.

2. In a fluid-pressure turbine, the combination with a casing having a plurality of annular sets of expansion passages and one or more annular flanges corresponding to each set, of a rotary drum having portions which are concentric with said sets of passages and having adjacent portions that are provided with annular sets of blades of materially greater radial length than the corresponding dimensions of the exit openings of said passages, the concentric portions having annular flanges which are located at one side of and in close proximity to the stationary annular flanges and means for maintaining said relation of the stationary and rotary flanges.

3. In a fluid pressure turbine, two concentric rings each composed of a plurality of segments, a set of guide vanes attached to one of said rings and means for clamping the other ring against the free ends of the vanes.

4. In an elastic fluid turbine, an agent for converting thermal energy of the working fluid into kinetic energy in the form of velocity, comprising a supply portion, a contracted throat receiving fluid from the supply portion, a discharge portion communicating with said throat and partitions arranged in the throat portion.

5. In an elastic fluid turbine, an agent for converting thermal energy of the working fluid into kinetic energy in the form of velocity, comprising a supply portion, a contracted throat portion receiving fluid from the supply portion, a discharge portion communicating with the throat and partitions sub-dividing the throat.

6. In a fluid-pressure turbine, the combination with a casing having a plurality of rings severally provided with annular sets of expansion passages and upon their inner peripheries with one or more annular flanges or collars, of a rotary drum having portions concentric with said sets of passages and adjacent portions provided with annular sets of blades of greater length than the corresponding exit openings of said passages, said concentric portions having one or more annular flanges or collars located at one side of and in close proximity to the stationary annular flange or flanges and means for maintaining the relation between the stationary and rotary flanges.

7. In a fluid pressure turbine, the combination with a casing having a ring provided with an annular set of expansion passages and with one or more peripheral flanges or collars, of a drum having a portion concentric with said set of passages and an adjacent portion provided with a set of blades, said concentric portion being provided with one or more peripheral flanges or collars located in close lateral proximity to the stationary flanges or collars and means for maintaining said relative location.

8. In a fluid pressure turbine, the combination with a casing having a circumferentially and laterally divisible ring provided with a set of expansion passages and with a set of peripheral flanges or collars, of a drum provided with a set of blades and a set of peripheral flanges or collars which interleave with the stationary flanges or collars.

9. In a fluid pressure turbine, the combination with a casing having a series of circumferentially and laterally divisible rings provided with expansion passages and with peripheral flanges or collars, of a drum provided with a series of sets of blades located adjacent to the exit openings of the expansion passages and with peripheral flanges or collars that are interleaved with the stationary flanges or collars and means for holding the stationary and rotatable flanges or collars in close proximity to each other.

10. In a fluid pressure turbine, the combination with a casing having a plurality of rings which are respectively provided with annular sets of tapering passages or nozzles, of a drum having portions concentric with said rings and adjacent portions provided with blades which project in front of the nozzles, the concentric portions having annular flanges that project in close lateral proximity to corresponding flanges on the casing rings.

11. A turbine comprising an exterior casing, a rotatable drum therein, a nozzle ring attached to the casing and lying between the same and the drum, said ring and drum having interengaging annular ribs thereon, for the purpose specified, and said nozzle ring having diagonal nozzles therein, and a plurality of buckets attached to the drum and lying adjacent to the discharge side of the nozzle ring.

12. A turbine, comprising an exterior casing, a rotatable drum therein, a nozzle ring attached to the casing, the ring and drum having interengaged annular ribs, for the purpose specified, and buckets attached to the drum and located at the discharge side of the nozzle ring.

13. In an elastic fluid turbine, an agent for converting thermal energy of the working fluid into kinetic energy in the form of velocity, comprising a supply portion, a contracted throat portion receiving fluid from the supply portion, a discharge portion communicating with the throat and partitions sub-dividing the throat portion and extending into the supply and discharge portions.

14. A fluid discharge agent for elastic fluid turbines, comprising a supply portion, a contracted throat opening into the supply portion, a discharge portion communicating with the throat and coöperating therewith for imparting velocity to the motive fluid, and one or more partitions extending from the throat portion into the supply and discharge portions.

15. In an elastic fluid turbine, a rotor drum carrying a plurality of annular rows of impulse blades, an annularly disposed set of nozzles for each of said rows of blades whereby the thermal energy of the working fluid is converted into kinetic energy in the form of velocity and the energy due to said velocity is absorbed by said impulse blades and interleaving sealing means between said instrumentalities and said drum.

16. In an elastic fluid turbine, an agent for converting thermal energy of the working fluid into kinetic energy in the form of velocity, comprising a supply portion, a contracted throat communicating with said supply portion, a discharge passage communicating with said throat and a plurality of parallel partitions located within the supply portion.

17. In an elastic fluid turbine, an annularly disposed set of expansion nozzles, an interleaving seal between said nozzles and the turbine rotor and means for maintaining the turbine rotor in proper position relative to the leaves of said seal.

18. In an elastic fluid turbine, a rotor drum, a casing surrounding the same, a nozzle ring attached to the casing, an interleaving seal between said nozzle ring and said rotor drum and an annular row of impulse blades carried by the drum adjacent to the discharge side of said nozzle ring.

19. In an elastic fluid turbine, an exterior casing, a rotatable drum therein, a nozzle ring attached to the casing, buckets or blades attached to the drum and located at the discharge side of the nozzle ring and a labyrinth system of packing for minimizing the fluid leakage between said nozzle ring and drum.

20. In an elastic fluid turbine, an exterior casing, a rotatable drum therein, a nozzle ring attached to the casing, buckets or blades attached to the drum and located at the discharge side of the nozzle ring and interleaving packing between said nozzle ring and drum.

21. In an elastic fluid turbine, an agent for converting thermal energy of the working fluid into kinetic energy in the form of velocity, comprising a supply portion, a discharge portion, a contracted throat connecting said portions and a plurality of partitions arranged in said supply portion.

22. In an elastic fluid turbine, an exterior casing, a rotatable drum therein, a fluid inlet located centrally of said casing, oppositely discharging fluid nozzles secured to said casing adjacent to said inlet between said casing and said drum and labyrinth sealing means between said nozzles and said drum.

23. In an elastic fluid turbine, the combination of a rotary element and a series of annular chambers, each chamber being constructed to transform pressure into kinetic energy and discharge it against a single row of buckets upon the rotor element.

24. In an elastic fluid turbine, a plurality of annular chambers of progressively increasing areas for converting thermal energy of the working fluid into kinetic energy in the form of velocity and moving blades for absorbing the energy due to said velocity.

25. In an elastic fluid turbine, a plurality of annular chambers of progressively increasing areas for converting thermal energy of the working fluid into kinetic energy in the form of velocity and a single annular row of moving blades adjacent to the outlets of said chambers for absorbing the energy due to said velocity.

26. A multi-stage elastic fluid turbine, each stage of which comprises an annular chamber for converting thermal energy of the working fluid into kinetic energy in the form of velocity and a single row of blades for absorbing the energy due to said velocity.

27. A fluid discharge device for turbines comprising a supply portion, a contracted throat portion for receiving fluid from the supply portion, a discharge portion communicating with the throat portion and one or more partitions arranged in the throat portion.

28. In an elastic fluid turbine, in combination with the rotor and stator elements, a fluid inlet port provided in the stator element, a plurality of annular chambers located on each side of said inlet port and progressively increasing in area, for converting the thermal energy of the working fluid into kinetic energy in the form of fluid velocity, a single annular row of blades mounted on the rotor element between adjacent chambers and a fluid discharge port located at each end of said turbine.

29. In a multi-stage elastic fluid turbine, an annular nozzle for converting the thermal energy of the working fluid into kinetic energy in the form of fluid velocity and a plurality of blades mounted on said rotor element and receiving the motive fluid from said nozzle.

30. A turbine having a shell and a drum, there being a passage for working fluid between the shell and drum, rows of moving buckets within the passage of such length as to provide relatively large clearances between the relatively moving surfaces, and means dividing the passage into stages of different pressures, such means having relatively small clearances.

31. A turbine having a shell and a drum, there being a passage for working fluid between the shell and drum, rows of moving buckets within the passage having relatively large clearances, fixed buckets within the passage, and means attached to said fixed buckets for dividing the passage into stages, such means having small clearances.

32. A turbine having a casing and a drum, there being a passage for working fluid between the casing and drum, rows of moving buckets within the passage of such length as to provide relatively large clearances between the relatively moving surfaces, means dividing the passage into stages of different pressures and fluid sealing devices associated with said means and affording relatively small clearances.

In testimony whereof, I have hereunto subscribed my name this 10th day of November, 1902.

FRANCIS HODGKINSON.

Witnesses:
J. A. MacMurchy,
James B. Young.

---

Copies of this patent may be obtained for five cents each, by addressing the "Commissioner of Patents, Washington, D. C."